Patented June 3, 1930

1,761,369

UNITED STATES PATENT OFFICE

ARNOLD SHEPHERDSON AND WILLIAM WYNDHAM TATUM, OF MANCHESTER, ENGLAND, ASSIGNORS TO BRITISH DYESTUFFS CORPORATION LIMITED, OF MANCHESTER, ENGLAND

ANTHRAQUINONE DYES

No Drawing. Application filed February 9, 1927, Serial No. 167,067, and in Great Britain August 19, 1926.

We have heretofore proposed, the production of dyes by the action of sulphites upon halogen-amino-hydroxy-anthraquinones of the general formula:—

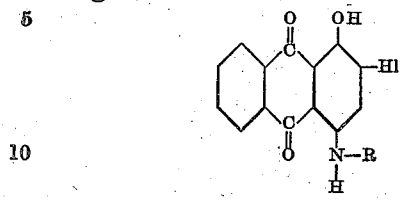

where R is an aryl group and Hl is a halogen.

In one way of operating, 100 parts of 1-hydroxy-2-chlor-4-tolylamino-anthraquinone (such as may be obtained, for example, by heating 1-hydroxy-2:4-dichlor-anthraquinone with p-toluidine) are dissolved in 700 parts of phenol in an autoclave and treated with a solution of 180 parts of sodium sulphite crystals in 470 parts of water. The autoclave is then sealed up and the whole heated at a temperature of 150° to 180° C. for 5 hours. The phenol is steamed off and the new dyestuff isolated from the filtered liquor by adding salt. The product forms, when dry, a blue powder soluble in water with a reddish-blue colour. From an acidulated dyebath, wool is dyed in brilliant reddish-blue shades of excellent fastness.

We have now further found that valuable acid dyes can be obtained by a similar process from sulphonated derivatives of the above type in which the aryl radical R carries a sulphonic group. Such sulphonated derivatives may be prepared from 2:4-dichloro- or 2:4-dibromo-erythro-hydroxy-anthraquinone by reaction with an arylamine, followed by sulphonation, as described in British Patent 21897 of 1900.

The present process comprises treating a halogeno-hydroxy-anthraquinone compound having the probable formula—

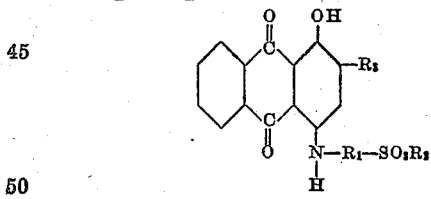

wherein $R_1$ represents a divalent phenylene residue which may or may not be further substituted with alkyl groups, $R_2$ represents metal or hydrogen and $R_3$ represents a halogen, with a solution of a metal sulphite, removing unchanged monosulphonate by filtration in the cold and evaporating the filtrate. The new dyestuffs so produced have the probable formula—

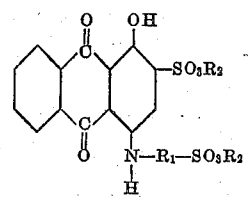

wherein $R_1$ represents a divalent phenylene residue which may or may not be further substituted with alkyl groups and $R_2$ represents metal or hydrogen. The disulphonated products obtained according to our present invention by the substitution of the $\beta$-halogen atom by a sulphonic group differ from the monosulphonated products already known in possessing greatly increased solubility and in general they give greener shades on wool from an acid bath.

A typical method of carrying out our invention is as follows, the parts being by weight:

Example 100 parts of the sodium salt of 2-chloro-1-hydroxy-4-sulpho-p-toluido anthraquinone of the structure—

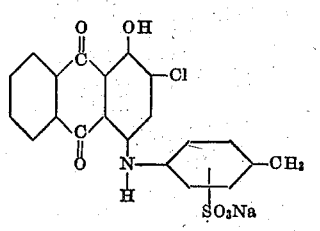

(prepared by sulphonating with 5 per cent fuming sulphuric acid the 2-chloro-1-hydroxy-4-p-toluido anthraquinone of melting point 188–189° C.)—are boiled with a solution of 100 parts of sodium sulphite crystals in 4000 parts of water until a test sample is practically completely soluble when cold. Any traces of unchanged mono-sulphonate are then filtered off cold, and the disulphonate is isolated by evaporation of the filtrate.

The dyestuff is thus obtained in the form of its sodium salt. The free acids possess no dyeing advantage over the salts obtained in this way.

The dyestuff is a 2-sulphonic derivative of 4-(sulpho-p-toluido)-1-hydroxy anthraquinone and in the form of its sodium salt it has the probable formula:

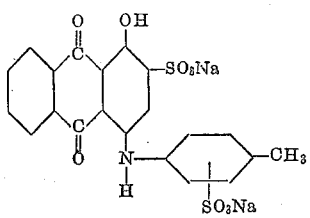

The dyestuff is a dark violet powder, soluble in water and in dilute acids to purple solutions, and in concentrated sulphuric acid to a green, becoming blue on addition of boric acid.

If in the above example there is substituted for the 2-chloro-1-hydroxy-4-sulpho-p-toluido anthraquinone an equivalent amount of the sodium salt of 2-chloro-1-hydroxy-4-sulpho-anilino-anthraquinone, there is obtained a dyestuff of the same general class.

100 parts of wool are introduced into a bath containing 1 part of the coloring matter so isolated, 10 parts of Glauber's salt, 4 parts of sulphuric acid and 5000 parts of water. On raising the temperature, the color is rapidly absorbed by the wool, which after an hour's boiling becomes dyed a reddish-blue shade of excellent fastness. After-chroming turns the shade greener.

When it is desired to produce the dyestuff in the form of free acid, the liquors obtained by filtering off the monosulphate may be acidified before evaporation.

What we claim and desire to secure by Letters Patent is:—

1. The process of making new dyestuffs having the probable formula—

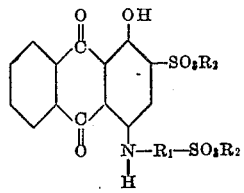

wherein $R_1$ represents a divalent phenylene residue which may or may not be further substituted with alkyl groups and $R_2$ represents an alkali metal or hydrogen, which comprises reacting a halogeno-hydroxyl-anthraquinone compound having the probable formula—

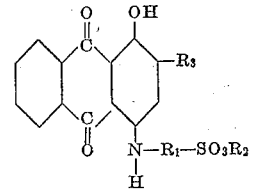

wherein $R_1$ represents a divalent phenylene residue which may or may not be further substituted with alkyl groups, $R_2$ represents an alkali metal or hydrogen and $R_3$ represents a halogen with a solution of an alkali-metal sulphite, removing unchanged monosulphonate by filtration in the cold and evaporating the filtrate.

2. The process of making new dyestuffs having the probable formula—

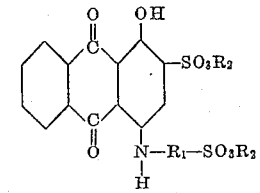

wherein $R_1$ represents a divalent phenylene residue which may or may not be further substituted with alkyl groups and $R_2$ represents an alkali metal or hydrogen, which comprises reacting a chloro-hydroxyl-anthraquinone compound having the probable formula—

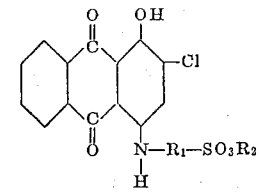

wherein $R_1$ represents a divalent phenylene residue which may or may not be further substituted with alkyl groups and $R_2$ represents an alkali metal or hydrogen, with a solution of an alkali-metal sulphite, removing unchanged monosulphonate by filtration in the cold and evaporating the filtrate.

3. The process of making new dyestuffs having the probable formula—

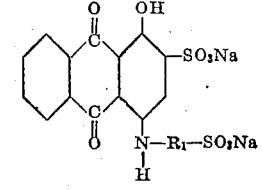

wherein $R_1$ represents a divalent phenylene residue which may or may not be further substituted with alkyl groups which comprises reacting a halogeno-hydroxyl-anthraquinone compound having the probable formula—

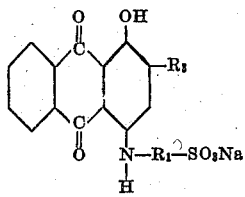

wherein $R_1$ represents a divalent phenylene residue which may or may not be further substituted with alkyl groups, and $R_3$ represents a halogen, with a solution of sodium sulphite, removing unchanged monosulphonate by filtration in the cold and evaporating the filtrate.

4. The process of making new dyestuffs having the probable formula—

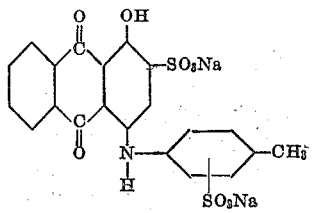

which comprises reacting a halogeno-hydroxyl-anthraquinone compound having the probable formula—

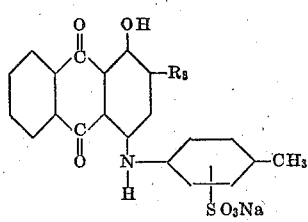

wherein $R_3$ represents a halogen, with a solution of sodium sulphite, removing unchanged monosulphonate by filtration in the cold and evaporating the filtrate.

5. The process of making new dyestuffs having the probable formula—

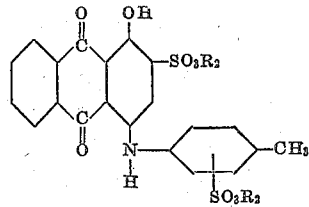

wherein $R_2$ represents an alkali metal or hydrogen, which comprises reacting a chlorohydroxyl-anthraquinone compound having the probable formula—

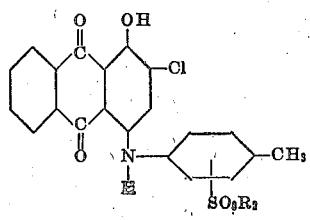

wherein $R_2$ represents an alkali metal or hydrogen, with a solution of an alkali-metal sulphite, removing unchanged monosulphonate by filtration in the cold and evaporating the filtrate.

6. As new dyestuffs, compounds having the probable formula—

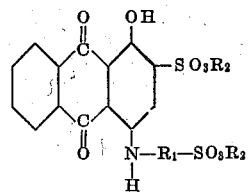

wherein $R_1$ represents a divalent phenylene residue which may or may not be further substituted with alkyl groups and $R_2$ represents an alkali metal or hydrogen, the said dyestuffs being dark blue to violet powders which are more soluble than the monosulphonated product and dye animal fibres in greener shades.

7. As new dyestuffs, compounds having the probable formula—

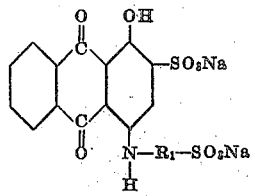

wherein $R_1$ represents a divalent phenylene residue which may or may not be further substituted with alkyl groups, the said dyestuffs being dark blue to violet powders which are more soluble than the monosulphonated product and dye animal fibres in greener shades.

8. An acid dyestuff, being a 2-sulphonic derivative of 4-(sulpho-p-toluido)-1-hydroxy anthraquinone, and having in the form of its sodium salt the formula—

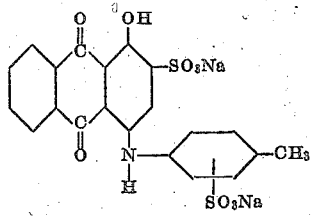

in substance and on the animal fibre, the said dyestuff being a dark violet powder, soluble in water and in dilute acids to purple solutions, and in concentrated sulphuric acid to a green becoming blue on addition of boric acid.

9. As dyestuffs, 1-hydroxy-4-sulpho toluido-anthraquinone-2-sulphonic acid derivatives obtained by reacting a sodium salt of 2-halogeno-1-hydroxy-4-sulpho toluido-anthraquinone with a solution of a metal sulphite, removing unchanged monosulphonate by filtration in the cold, and evaporating the filtrate, which differ from the known monosulphonated products by being much more soluble and giving greener shades on wool.

In testimony whereof we affix our signatures.

ARNOLD SHEPHERDSON.
    WILLIAM WYNDHAM TATUM.